United States Patent [19]

Wollar

[11] 4,403,893
[45] Sep. 13, 1983

[54] PULL-OUT TYPE EXPANSION FASTENER

[75] Inventor: Burnell J. Wollar, Barrington, Ill.

[73] Assignee: Phillips Plastics Corp., Phillips, Wis.

[21] Appl. No.: 239,315

[22] Filed: Mar. 2, 1981

[51] Int. Cl.³ ............................................. F16B 13/04
[52] U.S. Cl. ..................................................... 411/38
[58] Field of Search ...................... 411/15, 34, 35, 36,
411/37, 38, 39, 42, 43, 70, 63, 64, 65, 66, 68,
340, 341, 342, 343, 345, 346, 502, 508, 509, 510,
548, 61, 62

[56] References Cited

U.S. PATENT DOCUMENTS

| 964,226 | 7/1910 | Farrand | 411/15 UX |
| 3,350,976 | 11/1967 | Topf | 411/502 |
| 3,481,242 | 12/1969 | Topf | 411/502 |
| 3,651,734 | 3/1972 | McSherry | 411/15 UX |
| 3,698,279 | 10/1972 | Mallet | 411/15 UX |
| 3,959,853 | 6/1976 | Talan | 411/548 X |
| 4,122,583 | 10/1978 | Grütner | 411/44 X |
| 4,222,304 | 9/1980 | Yoshida et al. | 411/43 |
| 4,318,650 | 3/1982 | Llauge | 411/38 |

FOREIGN PATENT DOCUMENTS

| 1327260 | 4/1963 | France | 411/65 |
| 2161175 | 7/1973 | France | 411/61 |

Primary Examiner—Thomas J. Holko
Attorney, Agent, or Firm—James E. Nilles

[57] ABSTRACT

A one-piece, plastic fastener for lockable engagement in a workpiece opening, including a stem having an outer end and also having an inner end from which a pair of integrally formed arms extend. The arms have two ends, one end forming an acute angle with the inner end of the stem, and the other or free end terminating at an integrally formed head portion. The head portions are swingable with their respective arms about the inner end of the stem to cooperatively engage each other and to form a complete head having an orifice embracing the stem. The stem and arms are insertable into the opening to locate the head against the outer side of the workpiece. Positive and outward withdrawal of the stem through the opening and orifice causes the arms to swing laterally and abut firmly against the inner side of the workpiece. Serration means between the head and stem maintain the fastener in lockable engagement with the panel by readily permitting outward movement of the stem while resisting its inward movement.

2 Claims, 9 Drawing Figures

PULL-OUT TYPE EXPANSION FASTENER

BACKGROUND OF THE INVENTION

The invention relates to inexpensively produce, one-piece plastic fasteners for securing a plurality of panels together with selectively adjustable clamping pressure.

Prior art devices include the fastener disclosed in my copending U.S. patent application Ser. No. 220,908, filed Dec. 29, 1980, which issued Mar. 22, 1983 as U.S. Pat. No. 4,377,358 and entitled EXPANSION FASTENERS. This prior art fastener is lockably engageable in a workpiece and includes a stem and a pair of arms connected to and swingable about an inner end of that stem. A head portion is integrally formed at a free end of each of the arms, and the two head portions are swingable with the arms to come together to define an apertured head that embraces the stem. The stem is shiftable through the orifice towards its inner end and causes the arms to swing transversely and bear against the inner, generally inaccessible side of the workpiece. The prior art fastener is suitable for many applications where other than a tight, clamping engagement between a plurality of panels is desired and where selectivity in clamping pressure exerted by the fastener for a given workpiece is not required.

Other prior art fasteners suitable for providing variable clamping pressure upon a plurality of panels include those made in a multi-step molding process, such as that disclosed in U.S. Pat. No. 4,222,304, issued to Yoshida et al on Sept. 16, 1980. To fabricate the fastener shown in Yoshida, one mold is used to form a plunger element, and a release agent is applied to the plunger in a second step. Finally, the plunger is positioned in another mold into which plastic is injected to form a sleeve surrounding the plunger. The plunger of the two-piece fastener formed by this process may be pulled outwardly to place variable clamping pressure upon the panels engaged by the fastener. The three step production process, however, makes the fastener relatively expensive to manufacture.

SUMMARY OF THE INVENTION

The present invention provides a one-piece, plastic fastener for lockable engagement in a workpiece opening, and includes a stem having an outer end and also having an inner end from which a pair of integrally formed arms extend. The arms have two ends, one end forming an acute angle with the inner end of the stem, and the other or free end terminating at an integrally formed head portion. The head portions are swingable with their respective arms about the inner end of the stem to cooperatively engage each other and to form a complete head having an orifice embracing the stem. The stem and arms are insertable into the opening to locate the head against the outer side of the workpiece. Positive and outward withdrawal of the stem through the opening and orifice causes the arms to swing laterally and abut firmly against the inner side of the workpiece. Serration means between the head and stem maintain the fastener in lockable engagement with the panel by readily permitting outward movement of the stem while resisting its inward movement.

The present fastener is producible in one piece and on a simple, two-plate mold. The stem of the present fastener may be pulled outwardly until any desired serration is engaged with the head. As the stem is pulled progressively further outwardly, the arms exert increasing clamping pressure upon the workpiece.

The arms are swingable towards one another in a plane that includes both arms and the axis of the stem, and are biased radially outwardly of the stem and in the plane. The arms of a smaller width in a direction along the plane than in a direction transverse to the plane. Partly because of these differences in width, the arms are readily deformable in directions parallel to the plane but resist deformation in directions transverse to the plane. The head portions are cooperable along interengageable surfaces that are oblique to the plane, and which tend to translate forces by the radially outwardly biased arms along the plane into forces transverse to the plane. The arms resist these transverse forces and in this way resist shifting of the interengaged head portions away from each other.

Other objects and advantages will appear throughout the specification.

DESCRIPTION OF A PREFERRED EMBODIMENT

Figure 1:
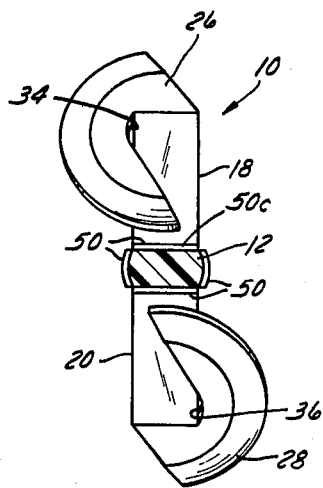
FIG. 1 is a front view, partially in section, of a fastener constructed in accordance with the invention and showing the two head portions disposed on opposite sides of the stem, the view being taken through the stem and along line 1—1 in FIG. 2.
Figure 2:
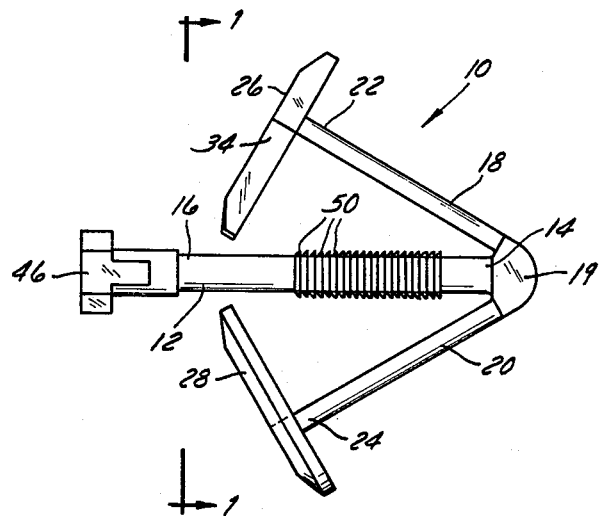
FIG. 2 is a side elevational view of the fastener shown in FIG. 1.
Figure 3:
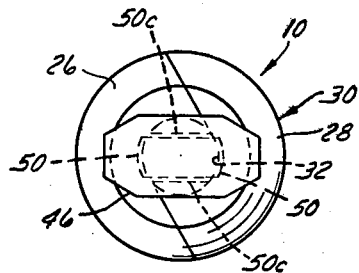
FIG. 3 is a front view of the fastener with the two head portions swung together to form a complete head.
Figure 4:
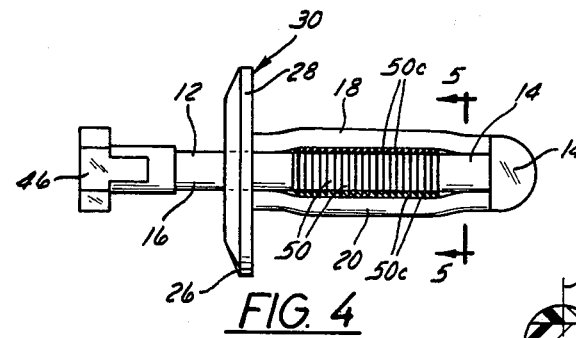
FIG. 4 is a side view of the fastener of FIG. 3.
Figure 5:
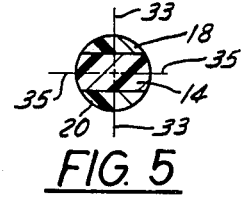
FIG. 5 is a sectional view of the stem and arms taken along lines 5—5 in FIG. 4.
Figure 9:
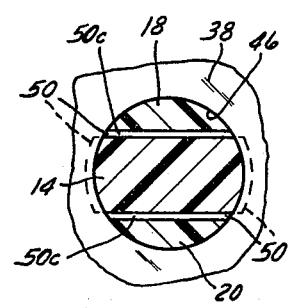
FIG. 9 is a sectional view of the stem and arms of the fastener of FIG. 8, taken along lines 9—9, and showing part of a serration in phantom.

The novel fastener 10 is shown in FIGS. 1 and 2 as it appears after its fabrication in a plastic injection machine utilizing a simple, two-plate mold. The fastener may be constructed of any one of several plastics, as for example polyethylene or nylon, that is resilient and flexible in thin sections and somewhat rigid in thick sections. A stem 12 has an inner end 14 and outer end 16. A pair of elongated arms 18 and 20 is formed integrally with and extends from the inner end 14 and in the direction of the outer end of the stem, each of the arms being positioned at an acute angle with respect to and disposed on opposite sides of the stem. The arms 18 and 20 are pivotable towards one another and towards the stem about their juncture 19 at the inner end 14, the juncture forming a tapered lead end to facilitate entry of the fastener through a workpiece orifice. Each arm has a free end 22 and 24 terminating in an integrally formed head portion 26 and 28, respectively, the head portions also being disposed on opposite sides of the stem 12. The arms 18 and 20 are limited in their movement towards one another by the stem 12, and are in substantial parallelism with each other and with the stem at that limit (FIGS. 3 and 4). The arms and stem, when in this parallel relationship, form a shank portion that is of circular cross section (FIGS. 5 and 9).

The head portions 26 and 28, which were spaced apart upon the fastener's removal from the two plate mold, swing with their respective arms about the inner end of the stem to cooperatively engage each other and to form a complete head 30 having an orifice 32 (FIG. 3) embracing the stem 12. The orifice 32 is of substantially the same size and shape as the stem 12, but is sufficiently larger so as to permit slidable movement of the stem along the orifice.

The arms 18 and 20 are of non-uniform cross section (FIG. 5) so as to permit bending or flexing of their narrower sections and resist such bending along wider sections. The arms in this embodiment are swingable in a plane which contains those arms and which also contains the axis of the stem, and are biased outwardly from that stem towards the positions shown in FIG. 2 at the acute angles with respect to the stem. This plane may be depicted in FIGS. 5 and 9 as a vertical line 33—33 passing through the center of the circular cross-section formed by the stem 12 and the arms 18 and 20 when the latter are parallel to each other. A direction transverse to this plane would be defined by a horizontal line 35—35 passing through this center. The width of the arms 18 and 20 along the plane defined by the vertical line 33—33 is less than the width of the arms in the direction transverse to the plane, and thus the arms tend to readily deform in that plane and resist deformation in that transverse direction. The tendency to deform in the plane facilitates movement of the arms about the inner end of the stem, and further facilitates bending of the arms so that they swing laterally away from the stem and towards firm, abutting engagement with the inner side of the panel, the arms in two of these lateral positions being shown in FIG. 6 and FIGS. 7 and 8. The tendency to resist deformation in the transverse direction aids in preventing movement of the parallel arms to off-center positions, or to the left or right of the stem, the directions being with respect to FIGS. 5 and 9.

Means are provided for shifting the forces of the outwardly biased arms from the plane to a direction transverse of the plane. The head portions 26 and 28 are cooperatively engageable along respective interengageable surfaces 34 and 36 that are oblique to the plane. The arms are biased radially outwardly from the stem and along the plane and tend to bias the head portions in this same radially outward direction, a direction in which the arms are readily deformable. The oblique surfaces, however, tend to translate part of these forces by the radially outwardly biased arms and along the plane into forces transverse to the plane. The arms, as explained above, resist deformation in this transverse direction, and thus the oblique surfaces aid in maintaining the parallel relationship of the arms (FIG. 4) and in preventing the head portions that form the complete head from shifting away from each other.

Figure 8:
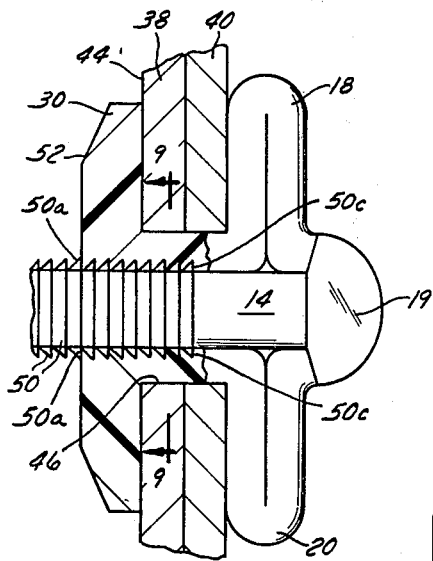
FIG. 8 is a fragmentary view, partially in section, of the fastener of FIG. 7 but on an enlarged scale, showing a serration engaging the portion of the head around the orifice so as to prevent inward movement of the stem and to thereby maintain lockable engagement of the fastener in the panel.

A pair of adjacent panels 38 and 40 forms a workpiece, and an opening 42 formed by concentric holes in the respective panels permits insertion of the fastener's stem and arms until the head is located against an outer side 44 of the workpiece on panel 38 (FIG. 8). Typically, the fastener will have been inserted by a tool that grips the means for engagement of the stem of its outer end, which means comprises a T-handle 46 integral with the outer end.

Figure 6:
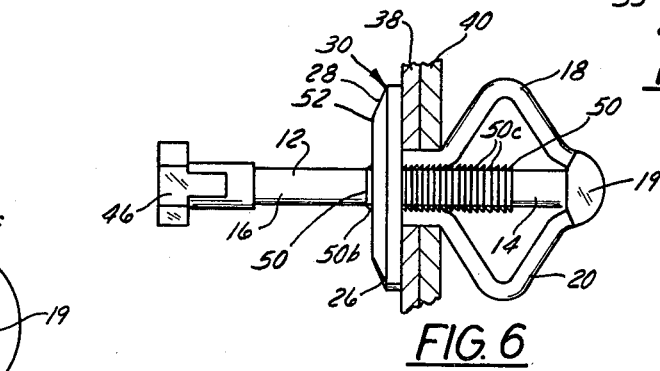
FIG. 6 is a side view of the fastener of FIG. 4, shown in a panel opening and with one of the outermost serrations engaging the complete head at the orifice so as to provide a relatively small clamping force upon the panels.
Figure 7:
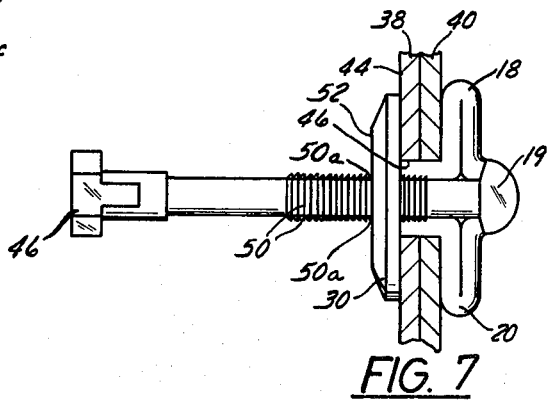
FIG. 7 is a side view of the fastener of FIG. 4, shown in a panel opening and with one of the innermost serrations engaging the complete head at the orifice so as to provide a relatively large clamping force upon the panels.

The arms swing laterally away from the stem and towards the firm, abutting engagement with the inner side 48 of the workpiece on panel 40 (FIG. 8) upon positive, outward withdrawal of the stem through the workpiece opening 42 and the orifice 32 in the complete head 30. To maintain the stem in the desired outward positions so that the fastener is lockably engaged in the workpiece, serration means are provided on the stem. These comprise a plurality of lengthwise-spaced serrations 50 on the stem that taper radially outwardly from the stem and towards the inner end 14. As the stem is being pulled outwardly through the orifice and along the parallel arms, the serrations push outwardly against and bite into the adjacent orifice and arms, causing the portion of the head defining the orifice 32 to assume the shape of the serrations. Upon removal of a serration, as for example 50a, from the orifice when the stem is pulled sufficiently outwardly, that serration adjacent the outwardly facing side 52 of the head 30 abuts the portion of the outer side 52 around the orifice (FIGS. 7 and 8). The serration construction thus permits movement of the stem towards its outer end, that is, to the left with respect to FIGS. 2, 4 and 6–8, while resisting movement of the stem in the opposite direction. Moreover, the longer, horizontal portions 50c of the collapsed serrations force the part of the arms adjacent the workpiece opening 42 radially outwardly and towards the perimeter of the opening so as to maintain the fastener in tight, wedging engagement in the opening.

Any of the lengthwise-spaced serrations may be selected to engage the outwardly-facing side 52 of the head to place the desired clamping pressure upon the workpiece. For example, FIG. 6 shows a serration 50b relatively close to the stem's outer end 16 and engaging the outer side 52 of the head to exert a small clamping pressure on the workpiece. FIG. 7 shows serration 50a nearer the stem's inner end 14 and engaging the outer side 52 to exert a large clamping pressure on the same workpiece. After the desired serration engages the outer side 52, the tool shears the portion of the serrated stem that protrudes outwardly from the head so that the outermost end of the remaining stem is substantially flush with the head. The stem must still protrude somewhat so that the head-engaging serration remains intact.

RECAPITULATION

The novel, one-piece fastener includes a plurality of serrations, selectively engageable to provide any of a number of clamping pressures upon a workpiece of a given size, and depending on the degree to which the stem is pulled outwardly. The complete head is formed from two head portions having respective interengageable surfaces, each head portion being integral with and biased transversely, i.e., radially outwardly with, an arm. The oblique orientation of these interengageable surfaces with respect to a plane along which the pair of arms is biased translates forces on the arms and in a direction along that plane into forces in a direction transverse to the plane, in which latter direction the arms more readily resist deformation and bending. The oblique surfaces thus aid in maintaining the arms in a parallel relationship by resisting shifting of the head portions away from each other, and enable the fastener to be constructed in one piece and on a two plate mold.

What I claim is:

1. A one-piece, plastic fastener for lockable engagement in an opening in a workpiece, said fastener comprising a stem having an inner end and an outer end, a pair of arms formed integrally with and extending from said inner end, said arms positioned at an acute angle relative to said stem, said arms each having a free end which terminates in an integrally formed head portion, said head portions being cooperatively engageable to form a complete head having an orifice embracing said stem, said arms being swingable about said inner end of said stem and in a plane containing the axis of said stem, said arms further being biased radially outwardly from said stem in said plane and to said position at an acute angle relative to said stem, said arms being of a smaller width along said plane than in a direction transverse to said plane whereby said arms are readily deformable in said plane and resist deformation in said transverse direction, and wherein said head portions are cooperable along interengageable surfaces that are oblique to said plane, said oblique surfaces upon interengagement tending to translate forces by said radially outwardly biased arms and along said plane into forces transverse to said plane; said arms resisting said transverse forces to thereby resist shiftable movement of said head portions away from each other, said stem and arms being insertable into said opening in said workpiece to locate said head against an outer side of said workpiece, said stem being positively withdrawn outwardly through said opening and said orifice to thereby cause said arms to swing laterally and abut firmly against the inner side of said workpiece, said outer end of said stem having means for engagement by a tool for said outward withdrawal of said stem, and serration means formed on said stem and extending through said orifice and engaging said head to maintain said fastener in said lockable engagement with said workpiece when said stem is forcibly shifted through said opening and orifice.

2. A one-piece, plastic fastener for lockable engagement in an opening in a workpiece, said fastener comprising a stem having an inner end and an outer end, a pair of arms formed integrally with and extending from said inner end, said arms positioned at an acute angle relative to said stem, said arms each having a free end which terminates in an integrally formed head portion, said head portions swingable with their respective arms about said inner end of said stem and in a plane containing the axis of said stem and to cooperatively engage each other to form a complete head having an orifice embracing said stem, said arms being biased radially outwardly from said stem in said plane and to said position at said acute angle relative to said stem, said arms further being of a smaller width along said plane than in a direction transverse to said plane whereby said arms are readily deformable in said plane and resist deformation in said transverse direction, and wherein said head portions are cooperable along interengageable surfaces that are oblique to said plane, said oblique surfaces upon interengagement tending to translate forces by said radially outwardly biased arms and along said plane into forces transverse to said plane, said arms resisting said transverse forces to thereby resist shiftable movement of said head portions away from each other, said stem and arms being insertable into said opening in said workpiece, and serration means between said head and said stem to maintain said fastener in said lockable engagement with said workpiece when said stem is forcibly shifted through said opening and orifice, said stem being positively withdrawn outwardly through said opening and said orifice to thereby cause said arms to swing laterally and abut firmly against the inner side of said workpiece.

* * * * *